US007060770B2

(12) United States Patent
Angeletakis

(10) Patent No.: US 7,060,770 B2
(45) Date of Patent: Jun. 13, 2006

(54) METATHESIS-CURABLE COMPOSITION WITH A REACTION CONTROL AGENT

(75) Inventor: Christos Angeletakis, Orange, CA (US)

(73) Assignee: Kerr Corporation, Orange, CA (US)

( * ) Notice: Subject to any disclaimer, the term of this patent is extended or adjusted under 35 U.S.C. 154(b) by 173 days.

(21) Appl. No.: 10/430,592

(22) Filed: May 6, 2003

(65) Prior Publication Data

US 2004/0225073 A1 Nov. 11, 2004

(51) Int. Cl.
C08F 4/80 (2006.01)
(52) U.S. Cl. .................. 526/171; 526/280; 526/281; 526/128
(58) Field of Classification Search ................ 526/171, 526/280, 281, 128
See application file for complete search history.

(56) References Cited

U.S. PATENT DOCUMENTS

| | | | |
|---|---|---|---|
| 4,717,498 A | 1/1988 | Maxon | 252/174.15 |
| 4,849,127 A | 7/1989 | Maxon | 252/174.15 |
| 5,198,511 A | 3/1993 | Brown-Wensley et al. | 526/113 |
| 5,266,670 A | 11/1993 | Nakos et al. | 528/32 |
| 5,296,566 A * | 3/1994 | Brown-Wensley et al. | 526/171 |
| 5,312,881 A | 5/1994 | Marks et al. | 526/126 |
| 5,330,948 A | 7/1994 | Marks et al. | 502/104 |
| 5,455,317 A | 10/1995 | Marks et al. | 526/126 |
| 5,491,206 A | 2/1996 | Brown-Wensley et al. | 526/126 |
| 5,728,785 A | 3/1998 | Grubbs et al. | 526/142 |
| 5,831,108 A | 11/1998 | Grubbs et al. | 556/21 |
| 5,939,504 A | 8/1999 | Woodson, Jr. et al. | 526/145 |
| 6,001,909 A | 12/1999 | Setiabudi | 524/265 |
| 6,040,363 A | 3/2000 | Warner et al. | 523/214 |
| 6,071,459 A | 6/2000 | Warner et al. | 264/311 |
| 6,075,068 A | 6/2000 | Bissinger | 523/116 |
| 6,077,805 A | 6/2000 | Van Der Schaaf et al. | 502/155 |
| 6,121,362 A | 9/2000 | Wanek et al. | 524/448 |
| 6,252,101 B1 | 6/2001 | Herzig et al. | 556/453 |
| 6,306,987 B1 | 10/2001 | Van Der Schaaf et al. | 526/171 |
| 6,310,121 B1 | 10/2001 | Woodson, Jr. et al. | 524/32 |
| 6,323,296 B1 | 11/2001 | Warner et al. | 526/171 |
| 6,403,522 B1 | 6/2002 | Bolm et al. | 502/155 |
| 6,407,190 B1 | 6/2002 | Van Der Schaaf et al. | 526/171 |
| 6,409,875 B1 | 6/2002 | Giardello et al. | 156/334 |
| 6,410,666 B1 | 6/2002 | Grubbs et al. | 526/171 |
| 6,417,363 B1 | 7/2002 | Van Der Schaaf et al. | 546/6 |
| 6,455,029 B1 * | 9/2002 | Angeletakis et al. | 424/49 |
| 6,465,554 B1 | 10/2002 | Van Der Schaaf et al. | 524/403 |
| 6,525,125 B1 | 2/2003 | Giardello et al. | 524/439 |
| 6,649,146 B1 | 11/2003 | Angeletakis et al. | 424/49 |
| 6,818,586 B1 * | 11/2004 | Grubbs et al. | 502/155 |
| 2002/0107138 A1 | 8/2002 | Hoveyda et al. | 502/152 |
| 2002/0137978 A1 | 9/2002 | Grubbs et al. | 585/507 |
| 2002/0153096 A1 | 10/2002 | Giardello et al. | 156/334 |
| 2002/0185630 A1 | 12/2002 | Piccinelli et al. | 252/184 |

FOREIGN PATENT DOCUMENTS

| | | |
|---|---|---|
| EP | 0796607 | 9/1997 |
| EP | 0771830 | 12/1999 |
| EP | 1025830 | 9/2000 |
| EP | 1241196 | 9/2002 |
| JP | 2001002719 | 1/2001 |
| JP | 2002284789 | 10/2002 |
| WO | WO 98/39346 | 9/1998 |
| WO | WO 99/00396 | 1/1999 |
| WO | WO 99/00397 | 1/1999 |
| WO | WO 99/29701 | 6/1999 |
| WO | WO 99/50330 | 10/1999 |
| WO | WO 99/60030 | 11/1999 |
| WO | WO 00/46255 | 8/2000 |

OTHER PUBLICATIONS

Scholl et al., "Synthesis and Activity of a new generation of ruthenium-based olefin metathesis catalysts coordinated with 1,3-dimesityl-4,5-dihydroimidazol-2-ylidene", Organic Letters, 1(6), 953-956(1999).*
International Organization for Standardization, *Dental Elastomeric Impression Materials*, ISO 4823 (1992).
Scholl et al., *Synthesis and Activity of a New Generation of Ruthenium-Based Olefin Metathesis Catalysts Coordinated with 1,3-Dimesityl-4,5-dihydroimidazol-2-ylidene Ligands*, Org. Lett., vol. 1, No. 6, 953-956 (1999).
Chevalier et al., *Ring-Opening Olefin Metathesis Polymerisation (ROMP) as a Potential Cross-Linking Mechanism for Siloxane Polymers*, J. of Inorganic and Organometallic Polymers, vol. 9, No. 3, 151-164 (1999).
L. LeCamp et al., *Polydimethyl siloxane photoreticulable par voie cationique-1*, Eur. Polym. J. vol. 33, No. 9, pp. 1453-1462 (1997).
Kim et al., *Surface-Initiated Ring-Opening Metathesis Polymerization on Si/SiO2*, Macromolecules 2000, 33(8), 2793-2795.

* cited by examiner

Primary Examiner—Ling-Sui Choi
(74) Attorney, Agent, or Firm—Wood, Herron & Evans, LLP

(57) ABSTRACT

A composition curable by a metathesis reaction upon mixing its components and comprising an olefin-containing substrate, a metathesis catalyst, and a reaction control agent for slowing the progress of the metathesis reaction. The metathesis catalyst is a ruthenium or osmium curbene complex catalyst, such as one containing an alkylidene ligand with basicity higher than that of tricyclohexylphosphine ($PCy_3$) and a neutral electron donor ligand with a basicity lower than that of $PCy_3$, whereby the catalyst initiates the metathesis reaction of the composition upon mixing with the substrate. The reaction control agent is an organic compound that contains carbon-carbon double and/or triple bonds and one or more Group 14 atoms and is present in an amount effective to slow the progress of the metathesis reaction. The olefin containing substrate may be, for example, one or a combination of a di-, tri- or quadri-functional polydimethylsiloxane end-capped with norbornenylethyl groups or a polydimethylsiloxane tethered and end-capped with norbornenylethyl groups.

49 Claims, No Drawings

METATHESIS-CURABLE COMPOSITION WITH A REACTION CONTROL AGENT

CROSS REFERENCE TO RELATED APPLICATION

This application is related to commonly-owned U.S. patent application Ser. No. 10/430,953, now U.S. Pat. No. 6,844,408 issued Jan. 18, 2005, entitled COMPOSITION CURABLE BY METATHESIS REACTION and Ser. No. 10/430,590 entitled METHOD OF CURING A COMPOSITION BY METATHESIS REACTION USING REACTION CONTROL AGENT, both filed on May 6, 2003, and to commonly-owned U.S. patent application Ser. No. 10/010,777 filed Dec. 6, 2001, now U.S. Pat. No. 6,649,146 issued Nov. 18, 2003 and entitled DENTAL IMPRESSION MATERIAL UTILIZING RUTHENIUM METATHESIS CATALYST, which is a continuation-in-part of U.S. Pat. No. 6,455,029 issued Sep. 24, 2002 and entitled DENTAL IMPRESSION MATERIAL UTILIZING RUTHENIUM CATALYST, the disclosures of which are incorporated herein by reference in their entirety as if completely set forth herein below. This application is also related to commonly-owned, U.S. patent application Ser. No. 10/313,359, now U.S. Pat. No. 6,861,386 issued Mar. 1, 2005, which claims the benefit of Provisional U.S. Patent Application Serial No. 60/338,439 filed Dec. 6, 2001, both entitled ACCELERATOR FOR METATHESIS CATALYST, the disclosures of which are incorporated herein by reference in their entirety as if completely set forth herein below.

FIELD OF THE INVENTION

This invention relates to compositions that undergo a metathesis reaction initiated by a metathesis catalyst and that contain a reaction control agent for controlling the progress of the metathesis reaction. More specifically, the control agent slows the progress of the metathesis reaction, and depending on the nature of the control agent, may prevent completion of the reaction until the composition is exposed to temperatures higher than the mixing temperature.

BACKGROUND OF THE INVENTION

Addition polymerizable silicone resins are widely used in many fields such as electronics, health care and automotive applications. The polymerizable resins are cured as a two-part system using a hydrosilation reaction. A platinum catalyst is used in one part, the catalyst side, and a hydrogen terminated polydimethylsiloxane (HPDMS) in the other part, the base side, while both sides contain vinyl terminated polydimethylsiloxanes (PVDMS) resins. When these materials are cured at room temperature, they are referred to as room temperature vulcanized (RTV). The most common RTV materials are typically offered as a 10:1 ratio base/catalyst, such as RTV630 (GE Silicones), while some other RTV materials are offered at a 1:1 ratio, such as RTV6428 (GE Silicones). Various working times are required depending on the application from 2 minutes to several hours and may involve a heat curing step above ambient temperature. The working time is controlled with a retarder or inhibitor mixed with the catalyst component, such as an amine or acetylenic compound.

Another class of addition polymerizable silicone resins are the liquid silicone rubber (LSR) materials prepared through the liquid injection molding (LIM) process. The LSR materials are cured at a temperature of 120° C.–180° C. in a mold injected to after mixing. The mixture includes a retarder mixed with the catalyst component, such as an amine or acetylenic compound, that allows the hydrosilation reaction to occur at the mold temperature only.

Both the RTV and LSR types of formulations suffer from the shortcomings of the hydrosilation mechanism. These shortcomings include: (1) deactivation of the platinum catalyst by sulfur or other nucleophilic impurities; (2) high shrinkage, approximately 1%, due to the high reduction of free volume upon polymerization; (3) high cost of platinum metal needed for catalysis; (4) high cost of HPDMS and PVDMS resins; (5) requirement of two different resins to be employed, namely vinyl and hydrogen terminated; (6) undesirable hydrogen evolution from the decomposition of the hydrosiloxane cross-linkers that typically are present in these systems; and (7) vinyl functionalized PDMS resins have a low hydrocarbon content in the main chain after polymerization due to the presence of only an ethyl spacer, which leads to a relatively high dielectric constant, which is an undesirable property for some electronic applications.

A new type of polymerization system has been recently developed that may potentially be used to replace addition-curable silicones and platinum catalysts in a wide variety of applications to thereby avoid the shortcomings of the hydrosilation mechanism discussed above. In this new metathesis reaction system, curing is achieved by a ring-opening metathesis polymerization (ROMP) mechanism. Metathesis is generally understood to mean the metal catalyzed redistribution of carbon-carbon double bonds. The polymerizable composition comprises a resin system that includes functionalities or groups that are curable by ROMP together with a metathesis catalyst, such as a ruthenium carbene complex. However, to efficiently utilize ROMP to prepare polymers, there is a need to control the progress of polymerization, particularly for molding applications.

In addition to ROMP, other metathesis reaction systems utilize metathesis catalysts, for example ring closing metathesis, acyclic diene metathesis polymerization, ring opening metathesis and cross metathesis. There is further a need for controlling the progress of reaction in these other metathesis reaction systems.

In addition to silicone resins, other thermoset monomer types that are curable by ROMP are the cycloolefins, such as dicyclopentadiene (DCPD). These resins are usually molded, and there is a further need to control the progress of the metathesis reaction for this monomer type.

SUMMARY OF THE INVENTION

The present invention provides a composition that upon mixing of its components undergoes a metathesis reaction, wherein the composition contains components for controlling and catalyzing the metathesis reaction. The composition comprises a ruthenium or osmium carbene complex catalyst that is capable of initiating a metathesis reaction, such as ring-opening metathesis polymerization (ROMP), a reaction control agent for slowing the progress of the reaction, and a metathesis-curable olefin substrate. The catalyst may have the following structure:

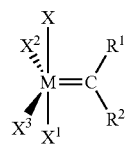

wherein:

M is ruthenium or osmium,

X is an alkylidene ligand with basicity higher than that of tricyclohexylphosphine (PCy$_3$), $X^1$ is a neutral electron donor ligand with a basicity lower than that of tricyclohexylphosphine, $X^2$ and $X^3$ are either the same or different and are any anionic ligand, and $R^1$ and $R^2$ are either the same or different and are each independently hydrogen or a substituent selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, wherein each of the substituents is substituted or unsubstituted. In an exemplary embodiment of the present invention, the catalyst has the following structure:

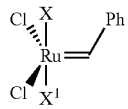

wherein Ph is phenyl, X is an alkylidene, such as a saturated imidazolidene, having a basicity (proton affinity) higher than tricyclohexylphosphine ($PCy_3$), and $X^1$ is a phosphine, phosphite, phosphinite or phosphonite whose basicity is lower than that of $PCy_3$. In a further exemplary embodiment, $X^1$ is a phosphine of the formula $PR^3R^4R^5$ where $R^3$, $R^4$, and $R^5$ are alkyl, aralkyl or aryl.

The composition further comprises a reaction control agent, which slows the progress of the metathesis reaction. The control agent allows the composition to be cured after a certain delayed time after mixing (work time or pot life) or allows for completion of curing only by heating to temperatures at least 30° C. above the mixing temperature at any time during the work time period. The control agent, and the amount thereof, also allows for control of the viscosity build up rate as the metathesis reaction proceeds, which is useful for many molding applications. The reaction control agent is an organic compound that contains carbon-carbon double and/or triple bonds and one or more central Group 14 atoms, and can further contain, in the case of a Si central atom, oxygen atoms connected to the silicon to form siloxane bonds. More particularly, the reaction control agent has the following structure:

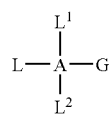

wherein:

G is selected from the group consisting of: $L^3$,

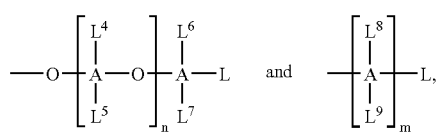

L is a hydrocarbon fragment containing a double or triple bond, $L^1$–$L^9$ are each independently selected from the group consisting of L, alkyl, aryl, aralkyl or haloalkyl, A is a Group 14 atom, n=0–20, and m=0–20.

Advantageously, L is an allyl (2-propenyl), vinyl (ethenyl), ethynyl, or propargyl (2-propynyl) group. Also advantageously, the reaction control agent includes more than one L group. In an exemplary embodiment of the invention, the reaction control agent is tetraallyl silane (TAS):

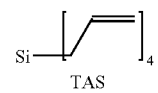

The catalyst and the reaction control agent are combined with an olefin substrate to provide a composition that undergoes the metathesis reaction with a controlled rate. In one embodiment of the present invention, thermal activation is needed to complete the metathesis reaction. In another embodiment, for preparation of thermoset polymers, cycloolefins such as dicyclopentadiene (DCPD) or cycloolefin terminated polysiloxanes can be used. In yet another embodiment, norbornenylethyl terminated or tethered polydimethylsiloxane resins are used.

DETAILED DESCRIPTION

The present invention provides formulations of ruthenium or osmium carbene complexes together with reaction control agents that allow control of the progress of a metathesis reaction on an olefin-containing substrate.

The catalysts useful in the present invention include ruthenium or osmium carbene complexes. The catalyst may have the following structure:

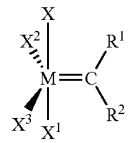

wherein:

M is ruthenium or osmium,

X is an alkylidene ligand with basicity higher than that of tricyclohexylphosphine ($PCy_3$), $X^1$ is a neutral electron donor ligand with a basicity lower than that of tricyclohexylphosphine, $X^2$ and $X^3$ are either the same or different and are any anionic ligand, and $R^1$ and $R^2$ are either the same or different and are each independently hydrogen or a substituent selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, wherein each of the substituents is substituted or unsubstituted.

One example of such catalyst, the parent benzylidene ruthenium complex 1, with the following structure, exhibits good air and water stability:

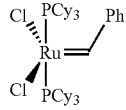

1 wherein Ph is phenyl, and Cy is cyclohexyl.

The ring-opening metathesis activity and air stability of the parent complex 1 can be increased by substituting an alkylidene ligand X, such as a saturated imidazolidine ligand, for one of the tricyclohexyiphosphine ligands, in accordance wit the following formula:

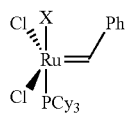

The ligands X maybe 4,5-dihydroimidazol-2-ylidenes, which have the following general structure:

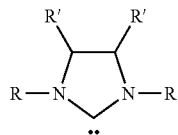

These substituted alkylidene ligands X have a basicity or proton affinity higher than that of tricyclohexylphosphine, which is believed to contribute to the higher activity and higher air stability. A derivative of complex 1 containing the alkylidene 1,3-bis(2,4,6-trimethylphenyl)-imidazol-2-ylidene (sIMES) ligand is shown here:

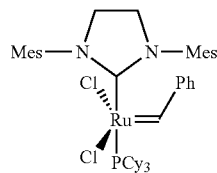

2 wherein Mes is mesityl (2,4,6 trimethylphenyl). Other 4,5-dihydroimidazol-2-ylidenes can also be used to afford ruthenium carbene complexes 3 and 4 having the following structures:

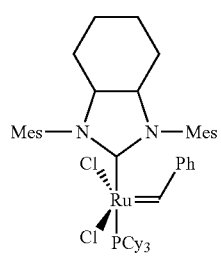

3

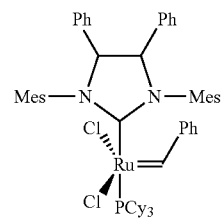

4 wherein Mes is mesityl, Ph is phenyl, and Cy is cyclohexyl.

To achieve a longer working time (pot life) and improve compatibility with the reaction control agents, tricyclohexyiphosphine ($PCy_3$) is substituted with a neutral electron donor ligand $X^1$ with a lower basicity (as expressed by the pKa) or proton affinity than $PCy_3$ as shown below:

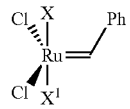

Examples of compound types that can be used as neutral electron donor ligands are: phosphines, phosphites, phosphinites or phosphonites. In an exemplary embodiment, $X^1$ is a phosphine of the formula $PR^3R^4R^5$ where $R^3$, $R^4$, and $R^5$ are alkyl, aralkyl or aryl, with a basicity lower than that of $PCy_3$. In a further exemplary embodiment, $R^3$, $R^4$, and $R^5$ each n-butyl, such that $X^1$ is tri-n-butylphosphine (PBu3), and X is sIMES as shown below as structure 5:

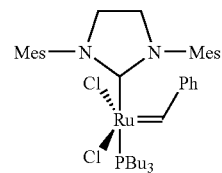

5

The composition further comprises a reaction control agent. After mixing of the composition components, the control agent slows the metathesis reaction, and thereby allows for an increase in the time period before cure, or before the metathesis reaction proceeds to completion or to a desired extent short of completion. The length of this time period, also called work time or pot life, may be further controlled by preventing completion of the reaction until the composition is heated to a temperature at least 30° C. above the mixing temperature. By way of example, the composition components may be mixed at ambient temperature, followed by heat curing at 60° C. or greater, such as 100° C. or 150° C., or the composition components may be mixed at sub-ambient temperatures (at least 30° C. below ambient), followed by raising the temperature to ambient to complete the reaction. The reaction control agent also allows for control of the viscosity build up as the metathesis reaction proceeds, which is useful for many molding applications. The reaction control agent is an organic compound that contains carbon-carbon double and/or triple bonds and one or more central Group 14 atoms, and can further contain, in the case of silicon as the central atom(s), oxygen atoms connected to silicon to form siloxane bonds. The reaction control agent has the structure shown below:

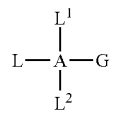

wherein:
G is selected from the group consisting of: $L^3$,

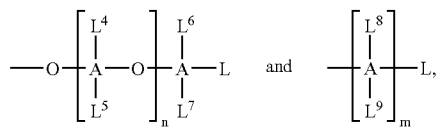

L is a hydrocarbon fragment containing a double or triple bond;
$L^1$–$L^9$ are each independently selected from the group consisting of L, alkyl, aryl, aralkyl or haloalkyl;
A is a Group 14 atom;
n=0–20; and
m=0–20.

Of the Group 14 atoms, which include C, Si, Ge, Sn and Pb, the central atom is advantageously Si, Ge or Sn, and more advantageously Si.

In one embodiment of the present invention, G=$L_3$ such that the reaction control agent is a tetracoordinated compound having at least one substituent group L that is a hydrocarbon fragment containing a double or triple bond. Allyl and vinyl groups are hydrocarbon fragments containing a double bond, for example, and alkynyl groups, such as propargyl and ethynyl groups, are hydrocarbon fragments containing a triple bond, for example. For the other substituent groups $L^1$, $L^2$, $L^3$, if not a hydrocarbon fragment containing a double or triple bond, then the substituent group is an alkyl, aryl, aralkyl or haloalkyl group, which are essentially inert to the metathesis reaction. Thus, it is the hydrocarbon fragment containing the double or triple bond that determines the extent of the retardation of the metathesis reaction, such that a greater number of such hydrocarbon fragments would be expected to achieve longer working times than similar structures containing fewer of such hydrocarbon fragments. An exemplary inert substituent is the methyl group.

In the embodiment of the present invention where G is defined as:

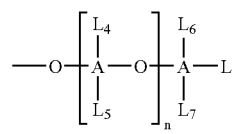

the central atom A is Si, such that the reaction control agent contains a straight chain siloxane compound in which the ends of the chain are capped by hydrocarbon fragments containing a double or triple bond. The substituent groups within the chain (i.e., $L^1$, $L^2$, $L^4$, $L^5$, $L^6$, $L^7$) may also be hydrocarbon fragments containing double or triple bonds or may be an inert substituent including alkyl, aryl, aralkyl or haloalkyl groups. By way of example, where A is silicon and n=0, a disiloxane compound is formed, such as divinyltetramethyldisiloxane.

In the embodiment of the present invention where G is:

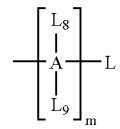

a structure is formed having a chain of single-bonded Group 14 atoms where the ends of the chain are capped by hydrocarbon fragments containing a double or triple bond. As with the previous embodiment, the substituent groups within the chain (i.e., $L^1$, $L^2$, $L^8$, $L^9$) may be either the hydrocarbon fragment with the double or triple bond or may be an inert alkyl, aryl, aralkyl or haloalkyl group. Where m=2, for example, a 3 atom chain is formed with 2 hydrocarbon fragment double or triple bond end groups and 6 $L^1$–$L^9$ substituent groups.

The composition further comprises an olefin-containing substrate (compound or mixture of compounds), such as a cyclic olefin-containing compound or mixture of compounds or an acyclic olefin-containing compound or mixture of compounds, which undergoes a metathesis reaction, such as ROMP, when mixed with the ruthenium carbene complex. The progression of the reaction is controlled by the reaction control agent, such as tetraallyl silane (TAS), to increase the working time of the composition and to control the viscosity build up. Advantageously, for a composition curable by ROMP, the resin system comprises at least one cyclic olefin functionalized majority (>50%) siloxane oligomer or polymer that is telechelic, tethered, tri-functional and/or quadri-functional. More specifically, the compound or mixture of compounds curable by ROMP may comprise one or a combination of the following: a polymerizable telechelic siloxane-based polymer end-capped with an olefin group curable by ROMP; a polymerizable siloxane-based polymer tethered and end-capped with an olefin group curable by ROMP; a polymerizable tri-functional siloxane-based oligomer or polymer end-capped with an olefin group curable by ROMP; and a polymerizable quadri-functional siloxane-based oligomer or polymer end-capped with an olefin group curable by ROMP. The olefin groups may be cycloalkenyl groups, for example norbornenyl or norbornenylethyl groups. The cycloalkenyl functionalized PDMS resins that are cured via ROMP have a higher hydrocarbon content than the vinyl functionalized PDMS resins that are used in hydrosilation reactions. The higher hydrocarbon content leads to a lower dielectric constant, which is desirable for many electronic applications.

In addition to the above category of oligomers and polymers, the olefin-containing substrate may comprise any other cycloalkenyl-functionalized oligomers or polymers that may undergo polymerization via ROMP mechanism, such as reactive cycloolefins, for example DCPD. Acyclic olefin-functionalized compounds that may undergo acyclic diene metathesis polymerization are also contemplated.

The composition of the present invention contemplates a catalyst paste and base paste that upon mixture with one another, form a curable paste/paste system in which the metathesis reaction proceeds. Generally, in this system, the catalyst paste comprises the metathesis catalyst for initiating polymerization, and a solvent for the catalyst that is miscible or dispersible with the base paste and that does not interfere with the metathesis reaction. The solvent may be, for example, 3-phenyl-heptamethyl-trisiloxane. Another exemplary solvent is a partially phenyl substituted poly(dimethylsiloxane), such as Dow Corning fluid 556. The base paste generally comprises the olefin-containing substrate that is curable via ROMP or other metathesis reaction, and the reaction control agent. The composition may further include filler systems and/or optional additives suitable for the particular application, such as pigments or surfactants, that do not interfere with the reaction.

The compositions of the present invention may be used to replace hydrosilation reaction systems using platinum catalysts and dual resin systems. The metathesis reaction is a homo-reaction using a single resin system, which simplifies the formulation, for example using the NBE-functionalized PDMS resins in combination with a ruthenium carbene complex catalyst. The compositions of the present invention enable easy formulation of RTV materials, for example, a material similar to RTV6428 (GE Silicones, Waterford, N.Y.), as set forth in Example 1 below, because the viscosity range and working time characteristics are similar to those materials.

The reaction control agent is incorporated into the base paste, to slow the ROMP mechanism upon mixing of the catalyst paste and base, thereby increasing the working time of the resin before cure, and even to prevent completion of the ROMP mechanism in the absence of an elevated temperature above the mixing temperature. While numerous retarders are known for use with the platinum catalysts in the hydrosilation mechanism, unexpectedly, some of the most common of them are not effective with the ruthenium carbene catalysts in the ROMP mechanism. However, tetraallyl silane (TAS), for example, has been found to provide significantly increased working time, particularly with catalyst 5. Similarly, other compounds having a Group 14 central atom and one or more ligands having a hydrocarbon fragment and carbon-carbon double or triple bond have also been found to be effective, as explained further, below.

EXAMPLE

Resins 1 and 2 were formulated to provide similar properties to that of the commercial RTV silicon marketed by GE, referred to as RTV6428. While RTV6428 is mixed with a 1:1 base/catalyst ratio, Resins 1 and 2 were mixed with a 10:1 ratio. A telechelic polydimethylsiloxane (PDMS) end-capped with norbornenylethyl groups was used in the base paste, with n=243 as shown below:

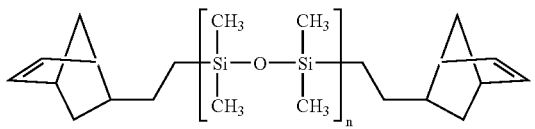

The base paste formulation is provided below in Table 1:

TABLE 1

| Base Paste Composition (wt. %) | |
|---|---|
| PDMS resin end-capped with norbornenylethyl groups | 71 |
| Hexamethyldisilazane treated Crystalline silica | 9 |
| Sub-micron hydrophobic Silica | 20 |
| Total | 100 |

The catalyst used in the catalyst paste is $PCy_3$ substituted ruthenium carbene complex (2) for Resin 1 and the $PBu_3$ substituted ruthenium carbene complex (5) for Resin 2, each obtained from Materia, Inc., Pasadena, Calif. The catalyst component was formulated by dissolving it in a partially phenyl substituted polymethylsiloxane, in particular, Dow Corning Fluid 556. The catalyst paste formulation is provided in Table 2:

TABLE 2

| Test Catalyst Paste Composition (wt. %) | |
|---|---|
| Dow Corning Fluid 556 | 36.05 |
| Calcium Silicate Wollastonite (2–10 μm) | 53.70 |
| Sub-micron Silica | 10 |
| Catalyst Complex 2 or 5 | 0.25 |
| Total | 100 |

The base paste and catalyst paste were mixed at ambient temperature. The physical properties for Resins 1 and 2 and the commercial RTV6428 composition are provided in Table 3. Also provided in Table 3 are the properties of two other 10:1 commercial RTV materials, RTV630, marketed by GE Silicones (Waterford, N.Y.) and V-2330 marketed by Rhodia (Troy, N.Y.).

TABLE 3

| Physical Property Comparison of Short Working Time Silicones | | | | | |
|---|---|---|---|---|---|
| | RTV6428 | RTV630 | V-2330 | Resin 1 | Resin 2 |
| Catalyst | Pt-based | Pt-based | Pt-based | 2 | 5 |
| Mixing Ratio | 1:1 | 10:1 | 10:1 | 10:1 | 10:1 |
| Viscosity of Base (Pa.s) | 0.88 | 113 | 14.8 | 19.6 | 19.6 |
| Working Time WT (h,m,s) | 1 m, 34 s | 2 h, 30 m | 10 m | 1 m, 28 s | ~10–30 m |
| Set time ST (h,m,s) | 2 m, 43 s | 6 h, 30 m | 1 h, 10 m | 3 m, 20 s | 5 h, 30 m |
| Tensile Strength (MPa) | 3.57 (0.30) | 6.27 (0.18) | 2.89 (0.77) | 3.47 (0.40) | 2.16 (0.36) |
| Elongation (%) | 85 (6) | 299 (24) | 325 (52) | 244 (16) | 235 (4) |
| Hardness, Shore A (100° C.) | 62 | 54 | 29 | 37 | 36 |
| Tear Strength (N/mm) | 3.3 (0.4) | 12.3 (2.2) | 12.37 (0.51) | 5.49 (0.06) | 4.62 (0.47) |

The Resin 1 and RTV6428 compositions provide similar working times and set times, as well as tensile strength. The compositions have different elongation, hardness and tear strength, which may be attributed to the type of filler and the extent of filler loading. The data in Table 3 suggests that catalyst 5 is far more sluggish at room temperature than catalyst 2, but affords materials with the same hardness. Thus, a straight chain $C_4$ alkyl phosphine is less active than a cyclic $C_6$ alkyl phosphine, such that longer working times may be achieved by limiting the phosphine ligands to acyclic $C_1$–$C_5$ alkyls. Thus, for applications desiring longer working times, a composition of the invention containing ruthenium carbene complex 5 having the tributylphosphine ligand provides advantageous results compared to a composition containing complex 2. However, the RTV630 composition still provides longer work and set times than Resin 2.

By using reaction control agents in the formulation, it is believed that longer working times, up to several hours, can be achieved at room temperature. Also, some retarding additives may be used to allow deactivation only below 120° C. to enable the composition's use as an LSR material. As discussed in the Background of the Invention, RTV and LSR materials cured by the hydrosilation reaction used a retarder mixed with the catalyst component, such as an amine or acetylenic compound, to control the working time and/or to allow the hydrosilation reaction to occur at the mold temperature only. Some of the retarders used with the hydrosilation mechanism were investigated to determine their effectiveness as reaction control agents with the ROMP mechanism, specifically compounds 11, 14 and 15 in Table 4 below. Resin 2 containing catalyst 5 with the tributylphosphine ligand was used as the control resin, with 0% reaction control agent. In each of the test resins, 0.14 mg/g concentration of reaction control agent was added to the base paste, and the weight percent of the resin was reduced by an equivalent amount. Unexpectedly, it was found that the commonly used retarders listed above for hydrosilation are ineffective in ROMP-cured RTV and LSR materials. However, one reaction control agent, specifically tetraallyl silane (TAS) at a concentration of 0.14 mg/g, had a remarkable effect on the working time, delaying it from about 10–30 minutes (Resin 2) to about 4½ hours. The working time at room temperature (RT) and the Shore A hardness after thermal treatment of the cured resins is provided in Table 4. Working time was determined by inserting a plastic stick into the paste and measuring the time at which the stick was no longer able to manipulate the paste and at which the stick could be removed from the paste without any appreciable amount of paste adhering to the stick.

TABLE 4

| Reaction Control Agent (RCA) | RCA Mol. Wt. | RCA mm/g resin | Working Time WT (RT)** | Shore A Hardness (after oven cure*) |
|---|---|---|---|---|
| Control-Resin 2 | — | — | ~10–30 min | 35 |
| Tetravinyl silane (2) | 136.77 | 0.00102 | ~1 h | 28 |
| 1,5,7-Tetravinyl-1,3,5,7-tetramethylcyclotetrasiloxane (3) | 344.66 | 0.00041 | ~30 min | 30 |
| Vinyltrimethylsilane (4) | 100.24 | 0.00140 | ~40 min | 38 |
| Vinylpentamethyldisiloxane (5) | 174.39 | 0.00080 | ~50 min | 37 |
| Tetraallyl silane (TAS, 6) | 192.37 | 0.00073 | ~4 h 30 min | 36 |
| Divinyltetramethyldisiloxane (7) | 186.4 | 0.00075 | ~30 min | 35 |
| Ethynyl TriMethylSilane (8) | 98.22 | 0.00143 | ~14 min | 37 |
| Allyl TriPhenylSilane (9) | 300.48 | 0.00047 | ~18 min | 36 |
| PentaErythritol Triacrylate (10) | 298.3 | 0.00047 | ~12 min | 37 |
| 1-Ethynyl-1-CycloHexanol (11) | 124.18 | 0.00113 | ~17 min | 0 |
| C14 Diol Dimethacrylate (12) | 338.49 | 0.00041 | ~10 min | 38 |
| Pyridine (13) | 79.1 | 0.00177 | ~20 min | 36 |
| TriEthylAmine (14) | 101.1 | 0.00138 | ~12 min | 38 |
| Benzotriazole (15) | 119.1 | 0.00118 | 1 h 30 min | 8 |

*Cured in oven at 100° C. for one hour after the onset of working time. A zero value for hardness indicates a failure of the paste to cure, thereby indicating deactivation of the catalyst.
**Because the working time was tested by a manual method, the results are only accurate to +/–10% of the value of the WT given, and the results are particularly inaccurate in the case of quick curing compositions, such as the control resin.

With the exception of TAS (6), some of the known retarders had little to no effect on slowing the ROMP reaction and some even appeared to act as weak accelerators. Not only did the addition of a small quantity of TAS drastically increase the working time, but it did so without affecting the hardness of the cured resin. Benzotriazole, commonly used with the hydrosilation reaction, was not effective due to its inability to harden (cure) even after exposure to elevated temperature for one hour. From the results of Table 4, it would appear that structures containing multiple allyl groups are more effective than analog structures containing multiple vinyl groups.

The TAS reaction control agent was also tested with Resin 1, which includes catalyst 2 with the tricyclohexylphosphine ligand. A concentration of 2.8 mg/g TAS only resulted in a working time of 2 hrs and 40 mins. Higher concentrations did not result in a cure when placed at 100° C. within 1 hr of mixing. Thus, the TAS control agent is particularly effective with the ruthenium carbene catalyst having an acyclic $C_1$–$C_5$ alkyl phosphine, such as a tributylphosphine ligand.

Given the remarkable effectiveness of the TAS control agent with catalyst 5, additional testing was performed. In particular, the TAS structure contains a central tetracoordinated silicon atom with the substituent groups being hydrocarbon fragments containing a double bond. Analog vinyl structures were also tested to further investigate the effect of the double bond. Potential reaction control agents were investigated having less than 4 allyl or vinyl substituents with the remaining substituents being inert groups, such as methyl. Similarly, hydrocarbon fragments containing a triple bond rather than a double bond were also investigated, in particular ethynyl and propargyl (2-propynyl) groups, which are examples of alkynyl groups. In addition to silicon as the central atom, tin was also tested to investigate the effectiveness of other Group 14 central atoms, wherein Group 14 refers to the 1988 IUPAC system for identifying groups in the periodic table. Group 14 includes carbon, silicon, germanium, tin and lead. In addition to a sole central atom, straight chain groups containing Group 14 atoms are also contemplated, in particular, siloxane chains and single-bonded Group 14 chains end functionalized with the hydrocarbon fragments. The compounds containing various functional groups that may act as reaction control agents were tested at the same molar concentration (0.036 mm/g) in order to keep the molar ratio of control agent to catalyst constant at 24.3. The results are provided in Table 5.

TABLE 5

| Reaction Control Agent | Working Time WT (RT) | Shore A after 100° C. for 1 hour at WT |
|---|---|---|
| Control-Resin 2 | ~10–30 min | 35 (1) |
| Vinyl Compounds | | |
| Tetravinyl silane (2) | 2 hrs | 26 (1) |
| Vinyltrimethyl silane (4) | 1 hr | 36 (1) |
| Divinyltetramethyl-disiloxane (7) | 5 hrs | 32 (1) |
| Allyl Compounds | | |
| Tetraallyl silane (TAS, 6) | 48 hrs | 35 (0) |
| Allyltrimethyl silane | 1 hr | 35 (0) |
| Tetraallyl stannane | ~25 hrs | 32 (1) |
| Alkynyl Compounds | | |
| Ethynyltrimethyl silane | 2 hrs, 20 min | 30 (1) |
| Propargyltrimethyl silane | ~26 hrs | 36 (1) |

As the results of Table 5 show, the control agent TAS containing multiple allyl groups is the most efficient at slowing the metathesis reaction. Also, comparing the results of the ethynyl- and propargyl-trimethyl silanes to the vinyl- and allyl-trimethyl silanes, it would appear that in analog structures triple bonds may be more efficient at slowing the metathesis reaction than corresponding double bonds.

We also measured the viscosity of the paste mixture containing TAS as it varied with time after mixing at ambient temperature. The hardness was measured at each time interval, after curing for 1 hr. at 100° C. The results are shown in Table 6.

TABLE 6

| Time | Viscosity (Pa · s) | Shore A Hardness (100° C.) |
|---|---|---|
| Immediately After Mixing | 26 | 25 |
| 24 h After Mixing | 28 | 34 |
| 48 h After Mixing | 119 | 25 |
| 96 h After Mixing | 190 | 0 |
| Control (no TAS) Immediately After Mixing | 11 | 36 |

From the data in Table 6, it can be concluded that the viscosity build up with TAS is gradual and that the mixture can only be cured by heat within a certain time window. In other words, the metathesis reaction must be completed by heat curing before the catalyst loses its potency to metathesize the olefin compound, i.e., before the catalyst deactivates. This can be of an advantage for an LSR or RTV application since residual material will not cure inside the dosing equipment, which is undesirable.

Potential uses for compositions of the present invention include automotive applications, electric/electronics applications, electro and appliances, medical applications, textile applications, and other miscellaneous applications. By way of example and not limitation, automotive applications may include: distributor caps, cable bushings, loudspeaker covers, housing seals, bellows, plug seals, spark plug boots, vent flaps, grommets for weather packs, central door locker membranes, o-rings, gaskets, bushings, boots, and combined elements with thermoplastics. By way of example and not limitation, electric/electronics applications may include: sockets for antennas, terminals, plug connections, conductors (overvoltage), insulators (high voltage), housing seals, reinforced insulating hoses, vibration dampers (collectors), switch membrane covers (damp room switches), watch seals, insulating parts for hot adhesive guns, key pads for computers and telephones, anode caps, insulators and surge arresters, diaphragms, grommets, cable seals, and covers for switches. By way of example and not limitation, electro and appliance applications may include: small seals, cable bushings, reinforced insulating hoses, lamp seals, appliance feet, membranes, o-rings, diffuser for hair dryers, gaskets for faucets, gaskets for pressure cookers, detergent seals for dish washers, parts for coffee and espresso machines, coated glass fiber hoses for electric stoves, and water diffuser for shower bath. By way of example and not limitation, medical applications may include: seals for medical appliances, syringe plungers, breast nipple protectors, base plates (dental), inflating bellows, catheters, instrument mats, sterilization mats, o-rings for dialysers, earplugs, pipette nipples, catheter holders, cannula protection sleeves, nose clamps, valves and bellows for respirators, baby bottle nipples, baby pacifiers, stoppers, respiratory masks, Foley catheters, electrodes, parts for dental applications, and parts for medical equipment. By way of example and not limitation, textile applications may include: textile coating for conveyor belts, tents, compensators and technical applications, sleeves for electrical and heat insulation, heat reflecting fabrics for steel worker's coats, airbag coating, and printing inks. By way of example and not limitation, miscellaneous applications may include: swimming goggles, snorkels and mouthpieces for snorkels, elements for sport shoes, diving masks, swimming caps, respiratory devices, photocopier rolls and butcher's gloves. All of the foregoing are intended to be exemplary uses for the compositions of the present invention and are not intended to limit the invention in any way.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

The invention claimed is:

1. A composition capable of undergoing a metathesis reaction upon mixing its components, the components comprising:

an olefin-containing substrate comprising at least one oligomer or polymer having a backbone of >50% linear siloxane units, the oligomer or polymer functionalized with olefin groups capable of undergoing a metathesis reaction, wherein the at least one oligomer or polymer is selected from the group consisting of: a telechelic oligomer or polymer end-capped with the olefin groups, an oligomer or polymer tethered and end-capped with the olefin groups, a tri-functional oligomer or polymer end-capped with the olefin groups, and a quadri-functional oligomer or polymer end-capped with the olefin groups, and combinations thereof; and a metal carbene complex catalyst capable of initiating the metathesis reaction in the composition, wherein the catalyst has the structure:

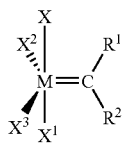

wherein:
M is ruthenium or osmium,
X is an alkylidene ligand with basicity higher than that of tricyclohexylphosphine ($PCy_3$),
X1 is a neutral electron donor ligand with a basicity lower than that of tricyclohexylphosphine,
$X^2$ and $X^3$ are either the same or different and are any anionic ligand, and
$R^1$ and $R^2$ are either the same or different and are each independently hydrogen or a substituent selected from the group consisting of $C_1$–$C_{20}$ alkyl, $C_2$–$C_{20}$ alkenyl, $C_2$–$C_{20}$ alkynyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, wherein each of the substituents is substituted or unsubstituted; and
a reaction control agent for slowing the progress of the metathesis reaction after mixing the composition components and having the structure:

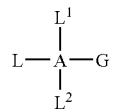

wherein:
G is selected from the group consisting of: $L^3$,

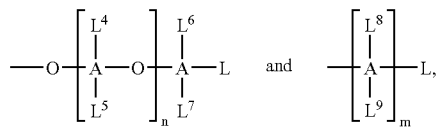

L is a hydrocarbon fragment containing a double or triple bond,
$L^1$–$L^9$ are each independently selected from the group consisting of L, alkyl, aryl, aralkyl or haloalkyl,
A is a Group 14 atom,
n=0–20, and
m=0–20.

2. The composition of claim 1 wherein the substrate comprises a polysiloxane tethered and end-capped with cycloalkenyl groups capable of undergoing a metathesis reaction.

3. The composition of claim 2 wherein the cycloalkenyl groups are norbornenyl groups.

4. The composition of claim 2 wherein the cycloalkenyl groups are norbornenylethyl groups.

5. The composition of claim 1 wherein the substrate comprises a polysiloxane end-capped with cycloalkenyl groups capable of undergoing a metathesis reaction.

6. The composition of claim 5 wherein the cycloalkenyl groups are norbornenyl groups.

7. The composition of claim 5 wherein the cycloalkenyl groups are norbornenylethyl groups.

8. The composition of claim 1 wherein $X^1$ is a phosphine, phosphite, phosphinite or phosphonite.

9. The composition of claim 8 wherein $X^1$ is a phosphine of the formula $PR^3R^4R^5$ wherein $R^3$, $R^4$, and $R^5$ are each an alkyl, aralkyl or aryl.

10. The composition of claim 9 wherein $X^1$ is a phosphine of the formula $PR^3R^4R^5$ wherein $R^3$, $R^4$, and $R^5$ are each n-butyl.

11. The composition of claim 1 wherein $R^1$ is phenyl and $R^2$ is hydrogen.

12. The composition of claim 1 wherein the X has the structure:

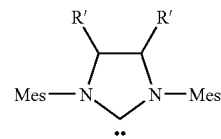

wherein Mes is mesityl and $R^1$ is hydrogen or phenyl.

13. The composition of claim 1 wherein the X has the structure:

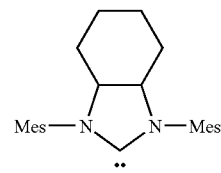

wherein Mes is mesityl.

14. The composition of claim 1 wherein the catalyst has the structure:

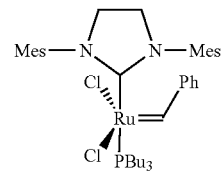

wherein Bu is butyl, Ph is phenyl and Mes is mesityl.

15. The composition of claim 1 wherein L is a hydrocarbon fragment containing an allyl group, a vinyl group, an ethynyl group or a propargyl group.

16. The composition of claim 15 wherein the reaction control agent includes at least two L groups.

17. The composition of claim 15 wherein the reaction control agent includes at least three L groups.

18. The composition of claim 1 wherein A is silicon.

19. The composition of claim 1 wherein the reaction control agent is tetraallyl silane.

20. A composition capable of undergoing a metathesis reaction upon mixing of its components, the components comprising:
an olefin-containing substrate comprising at least one oligomer or polymer having a backbone of >50% linear siloxane units, the oligomer or polymer functionalized with olefin groups capable of undergoing a metathesis reaction, wherein the at least one oligomer or polymer is selected from the group consisting of: a telechelic oligomer or polymer end-capped with the olefin groups, an oligomer or polymer tethered and end-capped with the olefin groups, a tri functional oligomer or polymer end-capped with the olefin groups, and a quadri-functional oligomer or polymer end-capped with the olefin grouns, and combinations thereof; and a metal carbene complex catalyst capable of initiating the metathesis reaction in the composition, wherein the catalyst has the structure:

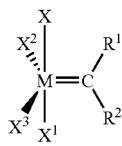

wherein:
M is ruthenium or osmium,
X is an alkylidene ligand with basicity higher than that of tricyclohexylphosphine (PCy$_3$),
X$^1$ is a neutral electron donor ligand with a basicity lower than that of tricyclohexylphosphine,
X$^2$ and X$^3$ are either the seine or different and are any anionic ligand, and
R$^1$ and R$^2$ are either the same or different and are each independently hydrogen or a substituent selected from the group consisting of C$_1$–C$_{20}$ alkyl, C$_2$–C$_{20}$ alkenyl, C$_2$–C$_{20}$ alkynyl, aryl, C$_1$–C$_{20}$ carboxylate, C$_1$–C$_{20}$ alkoxy, C$_2$–C$_{20}$ alkenyloxy, C$_2$–C$_{20}$ alkynyloxy, aryloxy, C$_2$–C$_{20}$ alkoxycarbonyl, C$_1$–C$_{20}$ alkylthio, C$_1$–C$_{20}$ alkylsulfonyl and C$_1$–C$_{20}$ alkylsulfinyl, wherein each of the substituents is substituted or unsubstituted; and a reaction control agent for preventing completion of the metathesis reaction in the absence of an elevated temperature of at least 30° C. above a mixing temperature of the composition components and having the structure:

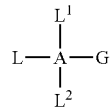

wherein:
G$^3$ is selected from the group consisting of: L$^3$,

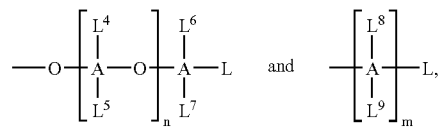

L is a hydrocarbon fragment containing a double or triple bond,
L$^1$–L$^9$ are each independently selected from the group consisting of L, alkyl, aryl, aralkyl or haloalkyl,
A is a Group 14 atom,
n=0–20, and
m=0–20.

21. The composition of claim 20 wherein the substrate comprises a polysiloxane tethered and end-capped with cycloalkenyl groups capable of undergoing a metathesis reaction.

22. The composition of claim 21 wherein the cycloalkenyl groups are norbornenyl groups.

23. The composition of claim 21 wherein the cycloalkenyl groups are norbornenylethyl groups.

24. The composition of claim 20 wherein the substrate comprises a polysiloxane end-capped with cycloalkenyl groups capable of undergoing a metathesis reaction.

25. The composition of claim 24 wherein the cycloalkenyl groups are norbornenyl groups.

26. The composition of claim 24 wherein the cycloalkenyl groups are norbornenylethyl groups.

27. The composition of claim 20 wherein X$^1$ is a phosphine, phosphite, phosphinite or phosphonite.

28. The composition of claim 27 wherein X$^1$ is a phosphine of the formula PR$^3$R$^4$R$^5$ wherein R$^3$, R$^4$, and R$^5$ are each an alkyl, aralkyl or aryl.

29. The composition of claim 28 wherein X$^1$ is a phosphine of the formula PR$^3$R$^4$R$^5$ wherein R$^3$, R$^4$, and R$^5$ are each n-butyl.

30. The composition of claim 20 wherein R$^1$ is phenyl and R$^2$ is hydrogen.

31. The composition of claim 20 wherein the X has the structure:

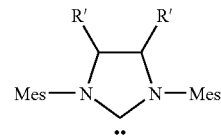

wherein Mes is mesityl and R$^1$ is hydrogen or phenyl.

32. The composition of claim 20 wherein the X has the structure:

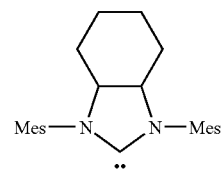

wherein Mes is mesityl.

33. The composition of claim 20 wherein the catalyst has the structure:

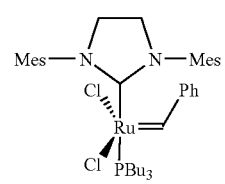

wherein Bu is butyl, Ph is phenyl and Mes is mesityl.

34. The composition of claim 20 wherein L is a hydrocarbon fragment containing an allyl group, a vinyl group, an ethynyl group or a propargyl group.

35. The composition of claim 34 wherein the reaction control agent includes at least two L groups.

36. The composition of claim 34 wherein the reaction control agent includes at least three L groups.

37. The composition of claim 20 wherein A is silicon.

38. The composition of claim 20 wherein the reaction control agent is tetraallyl silane.

39. A composition capable of undergoing a metathesis reaction upon mixing of its components, the components comprising:
- an olefin-containing compound comprising at least one oligomer or polymer having a backbone of >50% linear siloxane units, the oligomer or polymer functionalized with olefin groups capable of undergoing a metathesis reaction, wherein the at least one oligomer or polymer is selected from the group consisting of: a telechelic oligomer or polymer end-capped with the groups, an oligomer or polymer tethered and end-capped with the groups, a tri-functional oligomer or polymer end-capped with the groups, and a quadri-functional oligomer or polymer end-capped with the groups, and combinations thereof;
- a ruthenium carbene complex catalyst capable of initiating the metathesis reaction in the composition, wherein the catalyst has the formula:

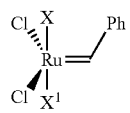

wherein Ph is phenyl, X is an alkylidene ligand having a basicity higher than that of tricyclohexylphosphine ($PCy_3$), and $X^1$ is a phosphine, phosphite, phosphinite or phosphonite having a basicity lower than that of $PCy_3$; and
- a reaction control agent for slowing the progress of the metathesis reaction after mixing the composition components and having the structure:

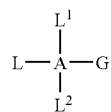

wherein:
G is selected from the group consisting of: $L^3$,

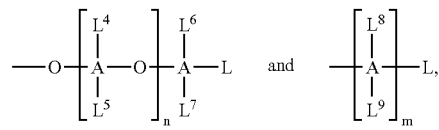

L is a hydrocarbon fragment containing an allyl group, a vinyl group, an ethynyl group or a propargyl group, $L^1$–$L^9$ are each independently selected from the group consisting of L, alkyl, aryl, aralkyl or haloalkyl, A is a Group 14 atom, n=0–20, and m=0–20.

40. The composition of claim 39 wherein the cycloalkenyl groups are norbornenyl groups.

41. The composition of claim 39 wherein the cycloalkenyl groups are norbornenylethyl groups.

42. The composition of claim 39 wherein $X^1$ is a phosphine of the formula $PR^3R^4R^5$ wherein $R^3$, $R^4$, and $R^5$ are each an alkyl, aralkyl or aryl.

43. The composition of claim 42 wherein $X^1$ is a phosphine of the formula $PR^3R^4R^5$ wherein $R^3$, $R^4$, and $R^5$ are n-butyl.

44. The composition of claim 39 wherein the X has the structure:

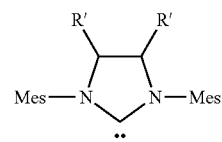

wherein Mes is mesityl and $R^1$ is hydrogen or phenyl.

45. The composition of claim 39 wherein the X has the structure:

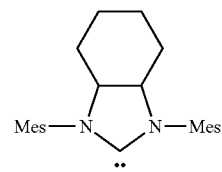

wherein Mes is mesityl.

46. The composition of claim 39 wherein the reaction control agent includes at least two L groups.

47. The composition of claim 39 wherein the reaction control agent includes at least three L groups.

48. The composition of claim 39 wherein A is silicon.

49. The composition of claim 39 wherein the reaction control agent is tetraallyl silane.

* * * * *

UNITED STATES PATENT AND TRADEMARK OFFICE
CERTIFICATE OF CORRECTION

PATENT NO. : 7,060,770 B2  Page 1 of 1
APPLICATION NO. : 10/430592
DATED : June 13, 2006
INVENTOR(S) : Angeletakis It is certified that error appears in the above-identified patent and that said Letters Patent is hereby corrected as shown below:

TITLE PAGE, ITEM (57)
Abstract, line 5, "curbene complex" should read --carbene complex--.
Col. 2, line 52, "olefin substrate" should read --olefinic substrate--.
Col. 4, line 19, "olefin substrate" should read --olefinic substrate--.
Col. 5, line 14, "tricyclohexyiphosphine ligands, in accordance wit" should read --tricyclohexylphosphine ligands, in accordance with--.
Col. 5, line 23, "ligands X maybe" should read --ligands X may be--.
Col. 6, lines 16-17, "tricyclohexyiphosphine" should read --tricyclohexylphosphine--.
Col. 6, line 35, "PBu3" should read --$PBu_3$--.
Col. 15, line 12, "aryl, $C_1$-$C_{20}$ carboxylate" should read --aryl, $C_1$-$C_{20}$ carboxylate--.
Col. 15, line 50, "$L^1$-$L^0$" should read --$L^1$-$L^9$--.
Col. 15, line 64, "polysiloxanc" should read --polysiloxane--.
Col. 16, line 9, "wherein $R^3R^4$," should read --wherein $R^3$, $R^4$,--.
Col. 17, line 5, "a tri functional oligomer" should read --a tri-functional oligomer--.
Col. 17, line 27, "seine" should read --same--.

Signed and Sealed this

Twenty-first Day of November, 2006

JON W. DUDAS
*Director of the United States Patent and Trademark Office*